Sept. 24, 1946.　　　　W. E. MENZIES　　　　2,407,994
REVERSIBLE SINGLE PHASE CAPACITOR MOTOR
Filed Oct. 16, 1943
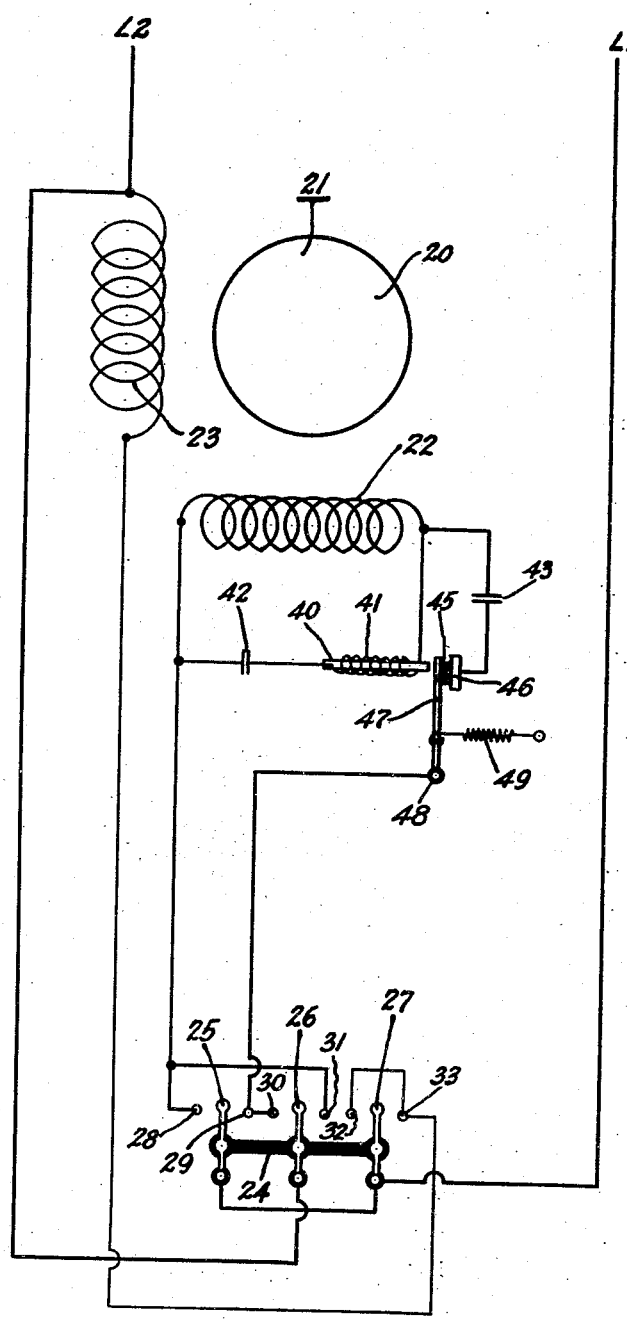
INVENTOR
WILLIAM E. MENZIES
BY Spencer, Hardman &c.
HIS ATTORNEYS.

Patented Sept. 24, 1946

2,407,994

UNITED STATES PATENT OFFICE 2,407,994

REVERSIBLE SINGLE-PHASE CAPACITOR MOTOR

William E. Menzies, Dayton, Ohio, assignor to General Motors Corporation, Detroit, Mich., a corporation of Delaware Application October 16, 1943, Serial No. 506,467

4 Claims. (Cl. 172—279)

This invention relates to improvements in control devices for electric motor and particularly for reversible single phase capacitor motors.

It is among the objects of the present invention to provide a reversible single phase capacitor motor with a control device which may be actuated, while the motor is operating at full speed, to effect a reversal in motor operation.

Further objects and advantages of the present invention will be apparent from the following description, reference being had to the accompanying drawing wherein a preferred embodiment of the present invention is clearly shown.

In the drawing in which a single view diagrammatically illustrates the electric motor, its control device for reversing purposes and their several electrical circuits, the numeral 20 designates the rotor of the electric motor 21. In the stator of the motor there is provided a starting winding 22 and a running winding 23. The two power lines to which said motor windings are adapted to be connected are designated L1 and L2 respectively.

A starting and reversing switch has three separate movable contact members 25, 26 and 27 secured together so as to be simultaneously actuated by an insulating operating bar 24. When in normal "off" position, each contact member is midway between two stationary contact terminals with which said contact member may be selectively engaged. Contact member 25 has the two stationary contact terminals 28 and 29, member 26, the contact terminals 30 and 31 and member 27 the contact terminals 32 and 33.

An electromagnetic switch forms a part of the motor control device and comprises a core 40 having an electromagnet winding 41 wound about it. One end of this electromagnet winding is shown connected to the one end of the starting winding 22, the other end of said electromagnet winding being connected to a condenser 42 which is also connected to the other end of the starting winding. Thus the electromagnet winding 41 and condenser 42, connected in series, are both connected directly across the starting winding 22.

The electromagnetic switch also comprises two normally engaging contacts 45 and 46, the latter being connected to the condenser 43 which is also connected to the starting winding 22. Contact 45, which is the movable contact, is carried by an arm 47 hingedly mounted as at 48. A spring 49 yieldably urges the arm 47 so that its contact 45 engages stationary contact 46 when the electromagnet switch is not energized.

The stationary contact terminals of the starting switch are connected as follows: terminal 28 with one end of the starting winding, 29 with the hinged arm 47, 30 with terminal 29 and thus arm 47, 31 with terminals 28 and consequently with said one end of the starting winding 22, 32 and 33 are connected together and both are connected with one end of the running winding of the motor.

The two movable contact members 25 and 27 of the starting and reversing switch are connected together and to the one power line L1. The movable contact member 26 is connected to the other power line L2 which is also connected to the other end of the running winding of the motor, or more specifically the end thereof opposite that connected to terminal 33 of the starting and reversing switch.

If, with the various elements and their circuit connections as described and shown, the starting and reversing switch operating bar 24 is moved toward the left, as regards the drawing, the movable contact members 25, 26 and 27 will be actuated counterclockwise to engage the respective stationary contact terminals 28, 30 and 32. The following circuits will now be established: from power line L1 through movable contact member 27, stationary contact terminal 32 engaged thereby, terminal 33 through the running winding 23 of the motor 21 to the other power line L2. Also from the power line L1 to the movable contact member 25, its stationary contact terminal 28, through the starting winding 22 of the motor 21, across the condenser 43 and engaging contacts 46 and 45, arm 47, stationary terminal contacts 29 and 30, movable contact member 26 to the other power line L2.

With both motor windings 22 and 23 connected with the power lines L1 and L2 and the current traversing the starting winding 22 in one direction, the motor 21 will start to operate in one direction. When the motor reaches a predetermined running speed a voltage will be set up or generated in the starting winding 22 due to the rotation of the rotor of the motor and the field produced by the running winding 23 of the motor. This generated voltage in the starting winding 22 will be directed to the electromagnet winding 41 causing it to be energized and thus magnetize the core 40. A condenser 42 is in circuit with magnet winding 41. This condenser 42 is of low impedance to the high frequency currents passing through this circuit and is not appreciably affected by them. If a condenser or a resistor of too high an impedance were utilized for the low impedance condenser 42, so that the high frequency currents would affect it, the relay would then offer too high an impedance resulting in its falling out and repeating or chattering.

When the core 40 of the electromagnetic switch is properly energized the arm 47 will be attracted and moved counterclockwise about its hinge support 48 against the effect of spring 49 and the contact 45 on said arm 47 will be disengaged from the stationary contact 46. This breaks the starting winding circuit and renders the starting winding ineffective as such. However the generated voltage therein is maintained as long as the motor operates at predetermined running speed and the running winding is effective thus during this time the electromagnet switch will remain energized to hold its contacts 45 and 46 disengaged.

If now the operator desires to reverse motor operation, he shifts the operating bar 24 and its attached movable contact members 25, 26 and 27 clockwise or to the right as regards the drawing. When this is done, said contact members 25, 26 and 27 will first be disengaged from their respective stationary contact terminals 28, 30 and 32, next will move through the neutral or off area and then will engage the stationary contact terminals 29, 31 and 33.

As soon as the stationary contact terminals 28, 30 and 32 are disengaged by the movable contacts 25, 26 and 27 respectively, all connections between the two power lines L1 and L2 and the starting and running windings 22 and 23 respectively of the motor are broken. This causes collapse of the field set up by the running winding 23 and consequently the voltage across the starting winding 22 will be reduced to zero resulting in a complete deenergization of the electromagnet switch and the engagement of its contacts 45 and 46 under the effect of spring 49. Now this gap in the circuit of the starting winding 22 is again closed and it remains necessary only to close the starting switch to effect motor operation.

While the movable contact members 25, 26 and 27 are moving through their neutral or off range the electric motor is not energized. However, as soon as these contacts engage their respective stationary contact terminals 29, 31 and 33 the following circuits are again completed; power line L1, movable contact 27, stationary contact 33 engaged thereby, thence through the running winding 23 to the other power line L2. Also power line L1, movable contacts 27 and 25 electrically connected one to the other, stationary contact 29, magnet switch arm 47, contacts 45 and 46, condenser 43, starting winding 22, stationary contact 31, movable contact 26 engaging it, thence to the power line L2. It will be noted that this direction of current flow through the starting winding 22 is exactly opposite to the flow when the starting switch is actuated counterclockwise or to the left as aforedescribed, thus causing the electric motor 21 to operate in the opposite direction.

Again, at the predetermined running speed of the motor 21, a voltage will be generated or set up across the starting winding 22 to energize the electromagnet switch and open its contacts 45 and 46 and thus break the starting winding circuit. Like before the electromagnet switch will be maintained energized to keep the starting winding circuit open as long as the motor runs at operating speed. When the starting switch is actuated to move its contacts 25, 26 and 27 out of engagement with the respective terminal contacts 29, 31 and 33 the running winding circuit is opened and the field set up thereby is collapsed thereby reducing the voltage across the starting winding 22 to zero and deenergizing the magnet switch, again permitting its spring 49 to cause contacts 46 and 47 to engage.

From the aforegoing it may be seen that the present invention provides a reversible single phase capacitor motor with a control device which is adapted to effect a substantially positive and safe reversal of motor operation even though the control device be actuated to reverse motor operation while the motor is running at high speed in one direction.

It is practically impossible to shift the starting switch from one circuit closing position into its other circuit closing position without effecting a collapse of the field set up by the running winding of the motor and its rotating rotor so that the voltage generated in the starting winding due to said field will be reduced to zero to fully deenergize the electromagnet switch and again close the starting circuit of the motor preparatory for the reverse operation.

While the embodiment of the present invention as herein disclosed constitutes a preferred form, it is to be understood that other forms might be adopted, all coming within the scope of the claims which follow.

What is claimed is as follows:

1. A control device for a reversible, single phase capacitor motor having a stator provided with starting and running windings adapted to be connected to power lines; a condenser in circuit with the starting winding; a starting switch movable from a neutral into one or another circuit closing position in which the motor windings are connected to the power lines for operating the motor in one or the other directions respectively; an electromagnetic control switch comprising an electromagnet winding, a condenser of low impedance connected in series with said electromagnet winding for stabilizing the control switch, both low impedance condenser and electromagnet winding being connected in parallel with the starting winding, said control switch comprising also a pair of normally closed contacts connected in series with said starting winding, the control switch being energized to open its contacts and maintain them open by voltage generated in the starting winding in response to the motor operation at a predetermined speed, the control switch being deenergized to permit its contacts to engage in response to the operation of the starting switch out of either of its circuit making positions.

2. A control device for a reversible, single phase capacitor motor having a stator provided with starting and running windings adapted to be connected to power lines; a condenser in circuit with the starting winding; a starting switch operative to close circuits for causing the motor to operate in one or the other directions respectively; control means in circuit with the starting winding and energized thereby to open the starting winding circuit when the voltage in the starting winding rises to a predetermined value in response to operation of the motor at a predetermined speed, said control means again closing the starting winding circuit when the starting switch is opened; and a second condenser of low impedance to the high frequency currents passing therethrough, connected in series with the control means for stabilizing its operation.

3. A control device for a reversible, single phase capacitor motor having a stator provided with starting and running windings adapted to be connected to electric power lines; a condenser in circuit with the starting winding; a starting switch movable from off into either one of two circuit closing positions for causing the motor to operate in either one or the other directions respectively; a second condenser being of low impedance to high frequency currents passing therethrough; and an electromagnetic switch having an electro-magnet winding connected in series with said second condenser and associated with the starting winding so as to be energized by voltage generated therein to open the starting winding circuit when the motor reaches a predetermined operating speed, said electromagnetic switch being deenergized and actuated to close its gap in the starting winding circuit when the starting switch is opened.

4. A control device for a reversible, single phase capacitor motor having a stator provided with starting and running windings adapted to be connected to power lines; a condenser in circuit with the starting winding; a starting switch movable from a neutral into one or another circuit closing position in which the motor windings are connected to the power lines for operating the motor in one or the other directions respectively; a second condenser of low impedance to high frequency currents passing therethrough; an electromagnetic control switch comprising a magnet winding connected in series with the second condenser and in parallel with the motor starting winding and comprising also a pair of normally closed contacts connected in series with said starting winding, said control switch being adapted to be energized, to open the contacts and break the starting winding circuit by voltage generated in said starting winding in response to operation of the motor at a predetermined speed, said control switch being deenergized and again closing its contacts when the starting switch is moved from one of its circuit closing positions toward neutral.

WILLIAM E. MENZIES.